US006668678B1

(12) United States Patent
Baba et al.

(10) Patent No.: US 6,668,678 B1
(45) Date of Patent: Dec. 30, 2003

(54) MANIPULATOR

(75) Inventors: Katsuyuki Baba, Fukuoka-ken (JP); Shigeaki Ino, Fukuoka-ken (JP); Yoichi Takamoto, Fukuoka-ken (JP)

(73) Assignee: TMSUK Co., Ltd., Fukuoka-ken (JP)

( * ) Notice: Subject to any disclaimer, the term of this patent is extended or adjusted under 35 U.S.C. 154(b) by 0 days.

(21) Appl. No.: 09/642,688

(22) Filed: Aug. 22, 2000

(30) Foreign Application Priority Data

Oct. 26, 1999 (JP) ............................................ 11-304651

(51) Int. Cl.⁷ .............................. B25J 17/00; B25J 1/00; B66L 23/00
(52) U.S. Cl. ........................ 74/490.04; 414/680; 901/21
(58) Field of Search ............................. 74/490.04, 479, 74/479 R, 89.2, 89.22; 901/21, 28, 23, 25, 36, 39, 14, 19; 414/680, 722, 727, 730, 739–741, 732, 738, 390.091; 294/111, 106

(56) References Cited

U.S. PATENT DOCUMENTS

| | | | | |
|---|---|---|---|---|
| 4,600,355 A | * | 7/1986 | Johnson | ..................... 901/21 X |
| RE32,414 E | * | 5/1987 | Hutchins et al. | .......... 901/21 X |
| 4,685,349 A | * | 8/1987 | Wada et al. | ................... 74/479 |
| 4,865,376 A | * | 9/1989 | Leaver et al. | ............. 901/21 X |
| 4,921,293 A | * | 5/1990 | Ruoff et al. | ............... 74/479 X |
| 5,207,114 A | * | 5/1993 | Salisbury, Jr. et al. | ... 74/89.2 X |
| 5,647,554 A | * | 7/1997 | Ikegami et al. | .......... 414/390.9 |
| 5,792,135 A | * | 8/1998 | Madhani et al. | ......... 74/490.06 |

FOREIGN PATENT DOCUMENTS

| | | |
|---|---|---|
| JP | 58-144582 | 9/1983 |
| JP | 4-210393 | 7/1992 |
| JP | 6-008178 | 1/1994 |

* cited by examiner

*Primary Examiner*—Marcus Charles
(74) *Attorney, Agent, or Firm*—Sughrue Mion, PLLC

(57) ABSTRACT

A manipulator is provided whose drive transmission is carried out by using flexible tubes into which wire cables are inserted, drive portions are disposed at an appointed portion other than the manipulator, and respective joints are operated by the respective drive portions, wherein working efficiency and productivity are excellent. A manipulator is provided including joint portions and moving and rotating mechanisms which move and rotate the above joint portions, wherein the moving and rotating mechanism is provided with pulleys disposed at the joints, an endless wire which is rotated by motors each disposed at an appointed position of the supporting base and has an appointed portion fixed at the pulley, and a flexible tube having one end fixed in the vicinity of the side of the pulley and the other fixed in the vicinity of the motor, into which the wire is inserted, and one of the motors is disposed for one of the pulleys.

5 Claims, 8 Drawing Sheets

1

MANIPULATOR

TECHNICAL FIELD OF THE INVENTION

The present invention relates to a manipulator having joints disposed a supporting base such as the body portion of a robot, etc.

BACKGROUND OF THE INVENTION

Recently, unmanned operation and control have progressed in factories and power generation plants, and in particular, places where there is a very high degree of danger. In line therewith, various types of manipulators have been developed, which carry out work for workers.

A drive part built-in type in which the drive part such as a motor is incorporated in respective joints and a wire rope type in which a plurality of joints are driven by a drive portion such as a single motor with a trailed wire rope have been known as the prior art manipulators.

However, the abovementioned prior art manipulator has the following problems and shortcomings.

(1). Since, in a drive part built-in type manipulator, the drive part is incorporated in respective joints, the entire manipulator is heavy in weight, and it is necessary to increase the torque of members, which support the manipulator, (for example, a motor at the base of the manipulator and a motor for moving the entire apparatus). Therefore, the entire apparatus is accordingly heavy in weight, whereby operation efficiency is reduced along with a worsening of production efficiency.

(2). Since, in the drive part built-in type manipulator, it is necessary to secure a space for providing a drive part in respective joints, the manipulator itself is increased in scale, accordingly, the entire apparatus is also made larger, whereby operation efficiency is reduced along with a worsening of production efficiency.

(3). Since, in the wire rope type manipulator, a plurality of joints are interlockingly actuated by driving a drive part such as a single motor, etc., it is difficult to cause the joints to move complicatedly, and operation efficiency is worsened.

SUMMARY OF THE INVENTION

The invention was developed to solve the problems and shortcomings inherent in the prior arts. It is therefore an object of the invention to provide a manipulator comprising a wire for transmitting the power of a motor(s), and a flexible tube in which the wire slides, wherein, since said motor is disposed in the body portion of a robot other than the manipulator, and respective joints are driven by the respective motors, it is possible to make the manipulator small and light, to save power consumption, to improve the operation efficiency and to secure excellent production efficiency.

In order to solve the above object, the manipulator according to the invention has the following constructions.

A manipulator of the invention is disposed at the body portion of a robot or a supporting base such as a rack, at a work site, etc., and has one or more joints and a mechanism for moving and rotating the joints; wherein the moving and rotating mechanism is provided with pulleys secured at the joints; an endless wire which is rotated by motors each disposed at an appointed position on the supporting base and has an appointed portion fixed at the pulley; and a flexible tube having one end fixed in the vicinity of the side of the pulley and the other fixed in the vicinity of the motor, into which the wire is inserted; and wherein one of the motors is disposed for one of the pulleys.

With the abovementioned construction, the following effects can be brought about.

(1). The endless wire is rotated by driving the motor, whereby the pulley is rotated, resulting in rotation of the joints.

(2). Since the wire passes through the flexible tube, the pulley can be directly driven by the drive part even though obstacles such as other members reside between the pulley and the drive part.

(3). Since the motor is not disposed at the manipulator but is disposed on the supporting base such as the body portion of a robot, no space is required to dispose the motor(s) at the respective joints. Therefore, the distance between the respective joints can be shortened, whereby it is possible to make the manipulator small in size and light in weight. By making the manipulator small in size, a downsizing of the entire apparatus (for example, a robot) having the manipulator can be achieved, and transferability thereof can be improved. Therefore, operation efficiency can be much improved, whereby operation can be carried out even in a small space. Also, by lightening the weight of the manipulator, the torque of a motor for the part (for example, the base of an arm) that supports the weight of the entire manipulator and of a motor for moving the entire apparatus can be reduced. Therefore, power consumption can be saved.

(4). Since one pulley is provided for one motor, individual motors can be independently controlled, whereby the respective joints are caused to execute actions independent from the other joints. That is, complicated actions can be carried out, and operation efficiency is excellent.

Herein, it is recommended that an adjuster to adjust the length of the flexible tube is provided at the terminal end of the flexible tube, which can deal with elongation of the wire.

A manipulator of the invention is disposed at the body portion of a robot or a supporting base such as a rack, at a work site, etc., and having one or more joints and a mechanism for moving and rotating the joints; wherein the moving and rotating mechanism is provided with pulleys disposed at the joints; a linear wire having one end thereof fixed at the pulleys and the other end thereof fixed at an appointed portion of the supporting base and connected to the motors; a flexible, tube having one end fixed in the vicinity of the side of the pulley and the other fixed in the vicinity of the motor, into which the wire is inserted; and a resilient body disposed in engagement with the pulleys, which contracts as the motors wind up the wire; and wherein one of the motors is disposed for one of the pulleys.

With the abovementioned construction, the following actions can be brought about.

(1). The joints can be moved by driving the motors in the direction of winding up the wire. Also, as the motor is driven in the direction of unwinding the wire, the joints can be moved in the reverse direction by the restoration force of a contracted resilient body.

(2). Since the wire passes through the flexible tube, it is possible to directly connect the wire from the drive part to the pulley even though obstacles such as other members exist between the pulley and the drive part.

(3). The motor is not disposed at the manipulator, but is disposed on a supporting base of the body portion of a robot, etc., no space is required to arrange the motor at the respective joints, whereby it is possible to shorten the distance between the respective joints, and make the manipulator small in size and light in weight. By making the manipulator small in size, the entire apparatus (for example, a robot) having the manipulator can be made small in size, and transferability thereof can be improved. Therefore, operation efficiency can be much improved, whereby operation can be carried out even in a small space. Also, since the torque of a motor for the part (for example, the base of an arm) that supports the weight of the entire manipulator and of a motor for moving the entire apparatus can be reduced. Therefore, power consumption can be saved.

(4). Since one pulley is provided for one motor, individual motors can be independently controlled, whereby the respective joints are caused to execute actions independent from the other joints. That is, complicated actions can be carried out, and operation efficiency is excellent.

Herein, a spring structure such as a twisted coil spring or a rubber body, etc., may be used as a resilient body.

It is recommended that ah adjuster to adjust the length of the flexible tube is provided at the terminal end of the flexible tube, which can deal with elongation of the wire.

A moving and rotating mechanism is disposed at joints where it is necessary to detect the tension thereof, and a moving and rotating mechanism is disposed at joints other than the above, whereby more complicated and highly accurate work can be carried out.

The invention is also directed to a manipulator which is provided with a tension detecting mechanism disposed at an appointed point on the wire and which enables detection of the tension of the wire.

With the abovementioned construction, the following additional actions can be brought about.

(1). By detecting the tension of the wire and feeding it back to the operation portion of joysticks or the operation side of the display portion, etc., of a CRT, it is possible to prevent an accident in which excessive winding of the wire by the motor occurs. Therefore, safety is excellent.

(1). By detecting the tension of the wire and feeding it back to the operation portion of joysticks or the operation side of the display portion, etc., of a CRT, it is possible to prevent an accident in which excessive winding of the wire by the motor occurs. Therefore, safety is excellent.

Herein, a potentiometer, a resistance strain type sensor or a crystal type force sensor may be employed as a tension detecting mechanism. Also, a torque sensor which detects the torque of the motor may be also used.

The invention is also directed to a manipulator, wherein the tension detecting mechanism is provided with a tension pulley having one end thereof brought into contact with an appointed portion of the wire, which is disposed slidably in the vertical direction along the wire; a traction means for tracking the tension pulley to the wire side; and a potentiometer, whose resistance value varies in line with the amount of movement of the traction means, disposed at an appointed portion of the traction means.

With the abovementioned construction, the following additional actions can be brought about.

(1). An appointed portion of a wire presses and moves the tension pulley in proportion to the tension of the wire, and in line therewith, the traction means moves and the resistance value of the potentiometer varies. Therefore, it is possible to detect the tension of the wire by using the degree of changes in the resistance value of the potentiometer.

Effects of the invention

As described above, according to the manipulator of the invention, the following advantageous effects can be brought about.

(1). An endless wire can be moved and rotated by driving the motor, whereby the pulley also moves and rotates, and accordingly, the joints move and rotate.

(2). Since a wire is inserted into the flexible tube, it is possible to directly drive the pulleys from the drive portions even though obstacles such as other members exist between the pulleys and drive portions.

(3). Since the motors are not disposed at the manipulator, but are disposed on a supporting base such as the body portion of a robot, no space is required to install motors at respective joints, whereby it is possible to shorten the distance among the respective joints, and the manipulator can be easily lightened and down-sized. By down-sizing the manipulator, the entire apparatus (for example, a robot) including the manipulator can be also down-sized. Therefore, the transferability is excellent, and working efficiency can be further improved since work can be carried out in narrow spaces. Also, since the torque of a motor for a part (for example, the base of an arm) which supports the weight of the entire manipulator and of a motor for moving the entire apparatus can be reduced by lightening the weight of the manipulator, power consumption can be saved.

(4). Since one pulley is provided for one motor, individual motors can be independently controlled, whereby the respective joints are caused to execute actions independent from the other joints. That is, complicated actions can be carried out, and operation efficiency is excellent.

Herein, it is preferable that an adjuster to adjust the length of a flexible tube is provided at the end portion of the flexible tube, because it can deal with elongation of the wire.

According to another aspect of the invention, the following effects can be brought about.

(1). The joints can be moved by driving the motors in the direction of winding up the wire. Also, as the motor is driven in the direction of unwinding (sending out) the wire, the joints can be moved in the reverse direction by the restoration force of a contracted resilient body.

(2). Since the wire passes through the flexible tube, it is possible to directly connect the wire from the drive part to the pulley even through obstacles such as other members exist between the pulley and the drive part.

(3). The motor is not disposed at the manipulator, but is disposed on a supporting base of the body portion of a robot, etc., no space is required to arrange the motors at the respective joints, whereby it is possible to shorten the distance between the respective joints, and make the manipulator small in size and light in weight easily. By making the manipulator small in size, a downsizing of the entire apparatus (for example, a robot) having the manipulator can be achieved, and transferability thereof can be improved. Therefore, operation efficiency can be much improved, whereby operation can be carried out even in a small space. Also, by lightening the weight of the manipulator, the torque of a motor for a part (for example, the base of an arm) which supports the weight of the entire manipulator and of a motor for moving the entire apparatus can be reduced. Therefore, power consumption can be saved.

(4). Since one pulley is provided for one motor, individual motors can be independently controlled, whereby the respective joints are caused to execute actions independent from the other joints. That is, complicated actions can be carried out, and operation efficiency is excellent.

According to another aspect of the invention, the following additional effect can be brought about.

(1). By detecting the tension of the wire and feeding it back to the operation portion of joysticks or the operation side of the display portion, etc., of a CRT, it is possible to prevent an accidental excessive winding of the wire by the motor. Therefore, the safety is excellent.

According to another aspect of the invention, the following additional effect can be brought about.

(1). An appointed portion of a wire presses and moves the tension pulley in proportion to the tension of the wire, in line with which the traction means moves and resistance value of the potentiometer varies. Therefore, it is possible to detect the tension of the wire by using the degree of change in the resistance value of the potentiometer.

PREFERRED EMBODIMENTS OF THE INVENTION

Embodiment 1

Figure 1:
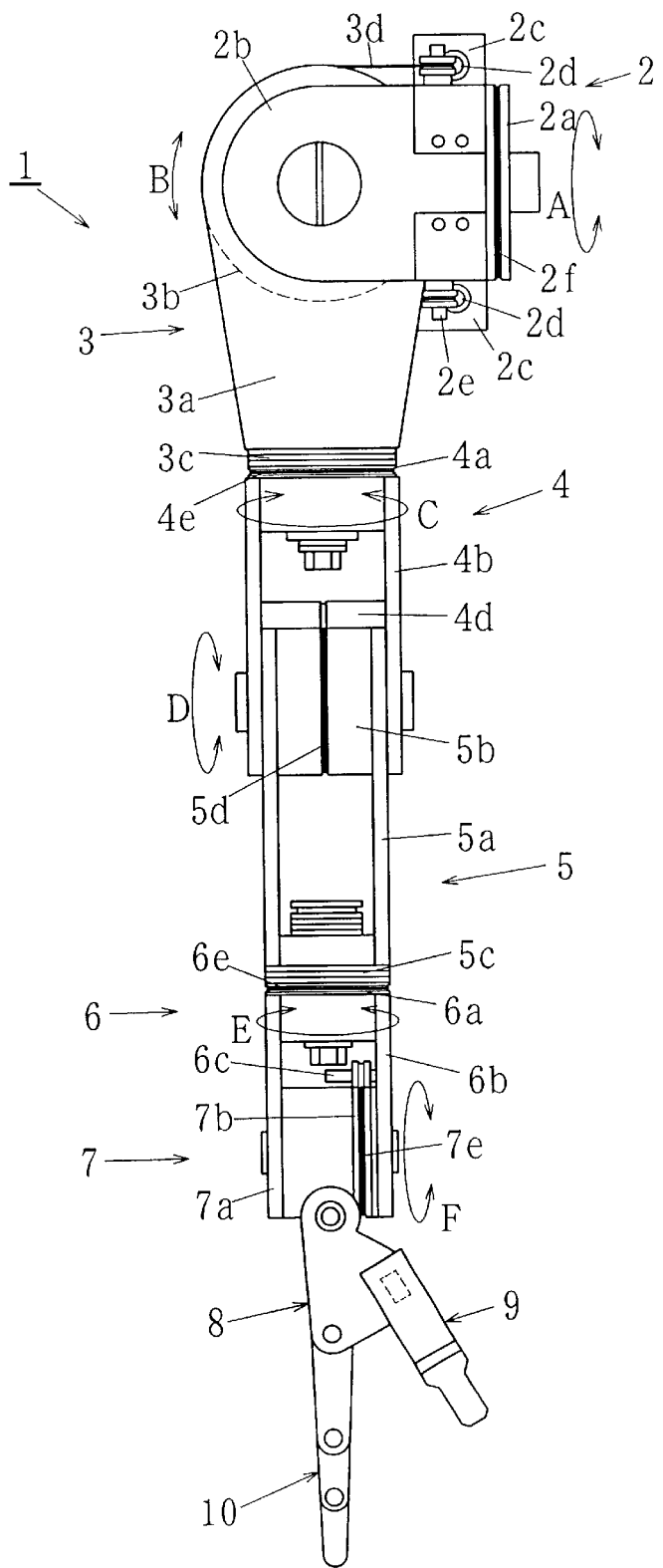
FIG. 1 is a front elevational view showing the major parts of a manipulator according to the first embodiment of the invention.
Figure 2:
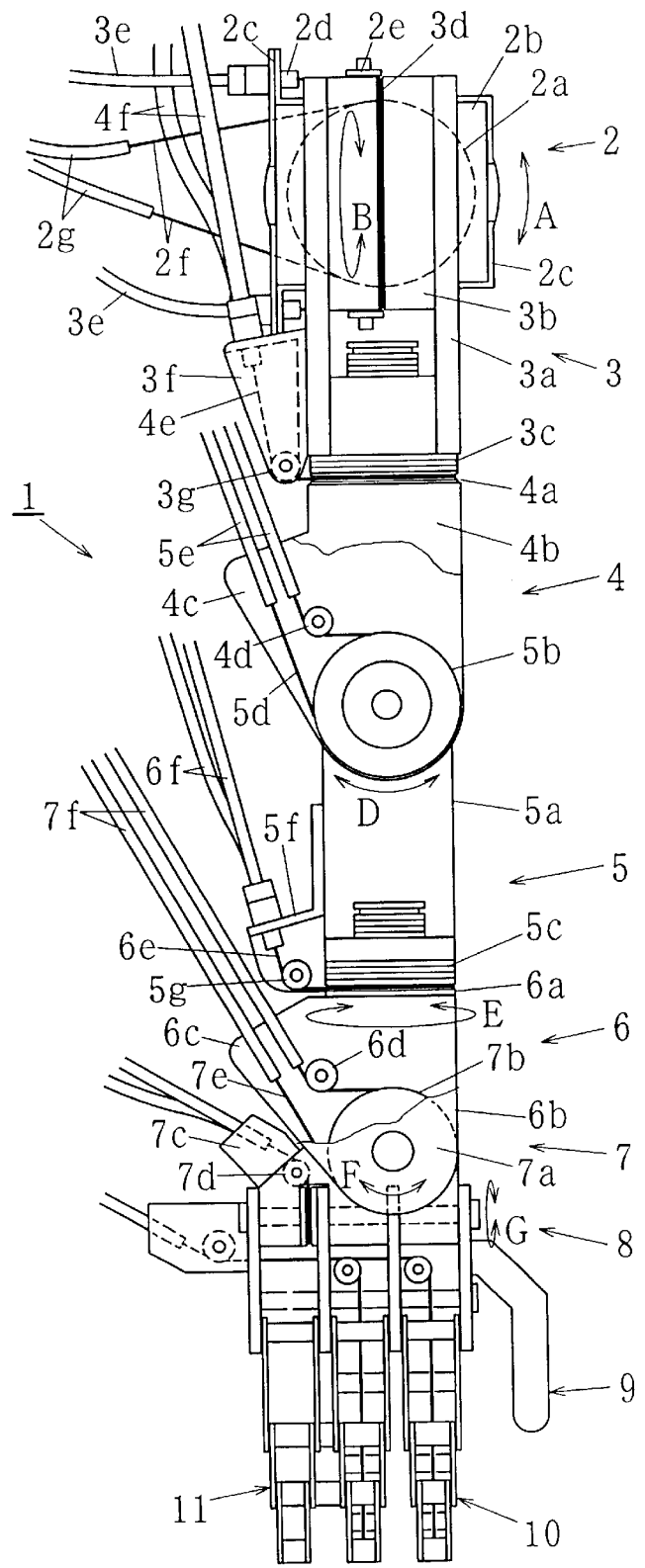
FIG. 2 is a partially broken side elevational view showing the major parts of the manipulator according to the first embodiment of the invention.

A description is given of the first embodiment of the invention with reference to the accompanying drawings:

FIG. 1 is an elevational view showing the major parts of a manipulator according to the first preferred embodiment of the invention, and FIG. 2 is a side view showing the major parts, which is partially broken, of the first embodiment of the invention. Also, the arrows illustrated in the respective drawings indicate the direction of rotation of respective members.

In FIG. 1 and FIG. 2, 1 indicates a manipulator in the first preferred embodiment, 2 indicates a shoulder pivotally supported on the body portion, etc., (not illustrated, hereinafter called "supporting base") of a robot rotatable in the direction of the arrow A. 2a indicates a shoulder pulley having a center axis which is pivoted at the supporting base, and 2b indicates a plate-like shoulder member, which is made of synthetic resin or metal, has one end thereof fixed at the shoulder pulley 2a. 2c indicates a wire metal fitting disposed at the upper and lower parts of the shoulder member 2b, and 2d indicates a hole portion for fixing a flexible tube, which is provided at an erect portion of the wire metal fitting 2c. 2e indicates a guide member having a side positioned in the vicinity of the hole portion 2d for fixing a flexible tube and having a small pulley, and 2f indicates an endless type shoulder wire which is fixed at the shoulder pulley 2a and is rotated by a shoulder motor (not illustrated) disposed at the supporting base. 2g indicates a shoulder flexible tube having the shoulder wire 2f slidably inserted therein, wherein one end thereof is fixed in the vicinity of the shoulder pulley 2a of the supporting base, and the other end thereof is fixed in the vicinity of the shoulder motor. The shoulder wire 2f is rotated by driving the shoulder motor. In line therewith, the shoulder pulley 2a is rotated to accordingly cause the shoulder 2 to turn in the direction of the arrow A.

3 indicates an upper arm portion having an upper portion pivotally supported at the shoulder 2 in the direction of the arrow B, in which the upper portion is placed between two shoulder members 2b and pivotally supported therebetween. 3a indicates an upper arm member consisting essentially of a synthetic resin member or metal plate-like member, etc., having an upper arm pulley 3b fixed at the upper part thereof, which is pivotally supported at the shoulder member 2b coaxially with the upper arm pulley 3b. 3c indicates a thrust bearing fixed at the lower end portion of the upper arm member 3a, 3d indicates an endless upper arm wire, which is rotated by an upper arm motor (not illustrated) disposed at the supporting base, extending like a loop from the upper arm motor to the same motor via the flexible tube fixing hole portion 2d, guide member 2e, upper arm pulley 3b, guide member 2e, and flexible tube fixing hole portion 2d, and the endless upper arm wire is fixed at the upper arm pulley 3b. 3e indicates an upper arm flexible tube in which the upper arm wire 3d slides, one end of which is fixed at the flexible tube fixing hole portion 2d and the other end of which is fixed in the vicinity of the upper arm motor. 3f indicates a flexible tube fixing portion which is fixed at the side of the upper arm member 3a and at which the end portion of the first middle arm flexible tube described later is fixed. 3g is a guide member which is disposed downward of the flexible tube fixing portion 3f and has a grooved portion formed on the rolling surface thereof. The upper arm wire 3d is rotated by driving the upper arm motor, in line with which the upper arm 3b is rotated, and accordingly, the upper arm 3 turns in the direction of the arrow B.

4 is the first middle arm portion having an upper portion supported at the lower end portion of the upper arm portion 3 rotatable in the direction of the arrow C. 4a is the first middle arm pulley fixed at the underside of the thrust bearing 3c coaxially with the thrust bearing 3c, and 4b is the first middle arm member, whose upper portion consisting essentially of a synthetic resin or metal plate-like member, which is fixed on the underside of the first middle arm pulley 4a. Two first middle arm members 4b hold the upper part of the second middle arm portion described later therebetween, and support it by an axis. 4c is a flexible tube fixing portion, which is formed at the side of the first middle arm member 4b and at which the end portion of the second finger flexible tube described later is fixed. 4d is a guide member having both ends thereof respectively fixed on the inner side wall of the two first middle arm members 4b and a grooved portion formed on the rolling surface thereof. 4e is an endless first middle arm wire which is rotated by the first middle arm motor (not illustrated) and starts from the first middle arm motor and returns to the same via the guide member 3g and flexible tube fixing portion 3f, passing through the flexible tube fixing portion 3f, guide member 3g and first middle arm pulley 4a. 4f is the first middle arm flexible tube into which the first middle arm wire 4e is slidably inserted, one end of which is fixed at the flexible tube fixing portion 3f, and the other of which is fixed in the vicinity of the first middle arm motor, wherein by driving the first middle arm motor, the first middle arm wire 4e is rotated, in line with which the first middle arm pulley 4a is rotated, and accordingly, the first middle arm portion 4 turns in the direction of the arrow C.

5 is the second middle arm portion, whose upper portion is supported at the lower part of the first middle arm portion 4 rotatable in the direction of the arrow D. 5a is the second middle arm member having the second middle arm pulley 5b fixed on the upper part thereof, and consisting essentially of a plate-like member made of synthetic resin or metal, which is pivotally supported at the lower part of the first middle arm member 4b coaxially with the second middle arm pulley 5b. 5c is a thrust bearing fixed at the lower end portion of the second middle arm member 5a. 5d is an endless second middle arm wire which starts from the second middle arm motor (not illustrated) and returns to the same via the flexible tube fixing portion 4c, passing through the flexible tube fixing portion 4c, guide member 4d and the second middle arm pulley 5b. 5e is the second middle arm flexible tube having the second middle arm wire 5d slidably inserted therein, one end of which is fixed at the flexible tube fixing portion 4c and the other end of which is fixed in the vicinity of the second middle arm motor. 5f is a flexible tube fixing portion which is disposed at the side of the second middle arm member 5a and at which the end portion of a lower arm flexible tube described later is fixed. 5g is a guide member disposed downward of the flexible tube fixing portion 5f and having a grooved portion formed on the rolling surface thereof, wherein by driving the second middle arm motor, the second middle arm wire 5d is rotated, in line with which the second middle arm pulley 5b is rotated and the second middle arm portion 5 turns in the direction of the arrow D.

6 is a lower arm portion, whose upper portion is supported at the lower part of the second middle arm portion 5 rotatable in the direction of the arrow E. 6a is a lower arm pulley fixed at the underside of the thrust bearing 5c coaxially therewith. 6b is a lower arm member, whose upper portion consisting essentially of a plate-like member made of synthetic resin or metal, which is fixed on the underside of the lower arm pulley 6a. 6c is a flexible tube fixing portion formed at the side wall of the lower arm member 6b. 6d is a guide member having both ends thereof respectively fixed on the inner side wall of the two lower arm members 6b and a grooved portion formed on the rolling surface thereof. 6e is an endless lower arm wire which is rotated by a lower arm motor (not illustrated) and which starts from the lower arm motor and returns to the same motor via the flexible tube fixing portion 5f, guide member 5g, lower arm pulley 6a, guide member 5g, and flexible tube fixing portion 5f. 6f is a lower arm flexible tube into which the lower arm wire 6e is slidably inserted, one end of which is fixed at the flexible tube fixing portion 5f, and the other end of which is fixed in the vicinity of the lower arm motor, wherein by driving the lower arm motor, the lower arm wire 6e is rotated, in line with which the lower arm pulley 6a is rotated, and accordingly, the lower arm 6 turns in the direction of the arrow E.

7 is a wrist portion supported at the lower part of the lower arm portion 6 rotatable in the direction of the arrow F. 7a is a wrist member having a wrist pulley 7b fixed at the upper part thereof and consisting essentially of a plate-like body made of synthetic resin or metal pivotally supported at the lower part of the lower arm member 6b coaxially with the wrist pulley 7b. 7c is a flexible tube fixing portion disposed at the side of the wrist member 7a. 7d indicates a guide member disposed diagonally downward of the flexible tube fixing portion 7c and having a grooved portion formed on the rolling surface thereof. 7e is an endless wrist wire which is rotated by a wrist motor (not illustrated) and which starts from the wrist motor and returns to the same motor via the flexible tube fixing portion 6c, guide member 6d, wrist pulley 7b, and flexible tube fixing portion 6c. 7f is a wrist flexible tube in which the wrist wire 7e is slidably inserted, one end of which is fixed at the flexible tube fixing portion 6c, and the other end of which is fixed in the vicinity of the wrist motor, wherein by driving the wrist motor, the wrist wire 7e is rotated, thereby causing the wrist pulley 7b to rotate, and accordingly the wrist portion 7 turns in the direction of the arrow F.

8 is a hand portion, whose upper portion supported at the lower part of the wrist portion 7 rotatable in the direction of the arrow G. 9 is the first finger portion (thumb finger) disposed at the side of the hand portion 8, 10 is the second finger portion disposed at the lower part of the hand portion 8. 11 is the third finger portion disposed in parallel with the second finger 10 at the lower part of the hand portion 8.

Next, a detailed description is given of the hand portion, the first finger, the second finger, and the third finger, with reference to the accompanying drawings.

Figure 3:
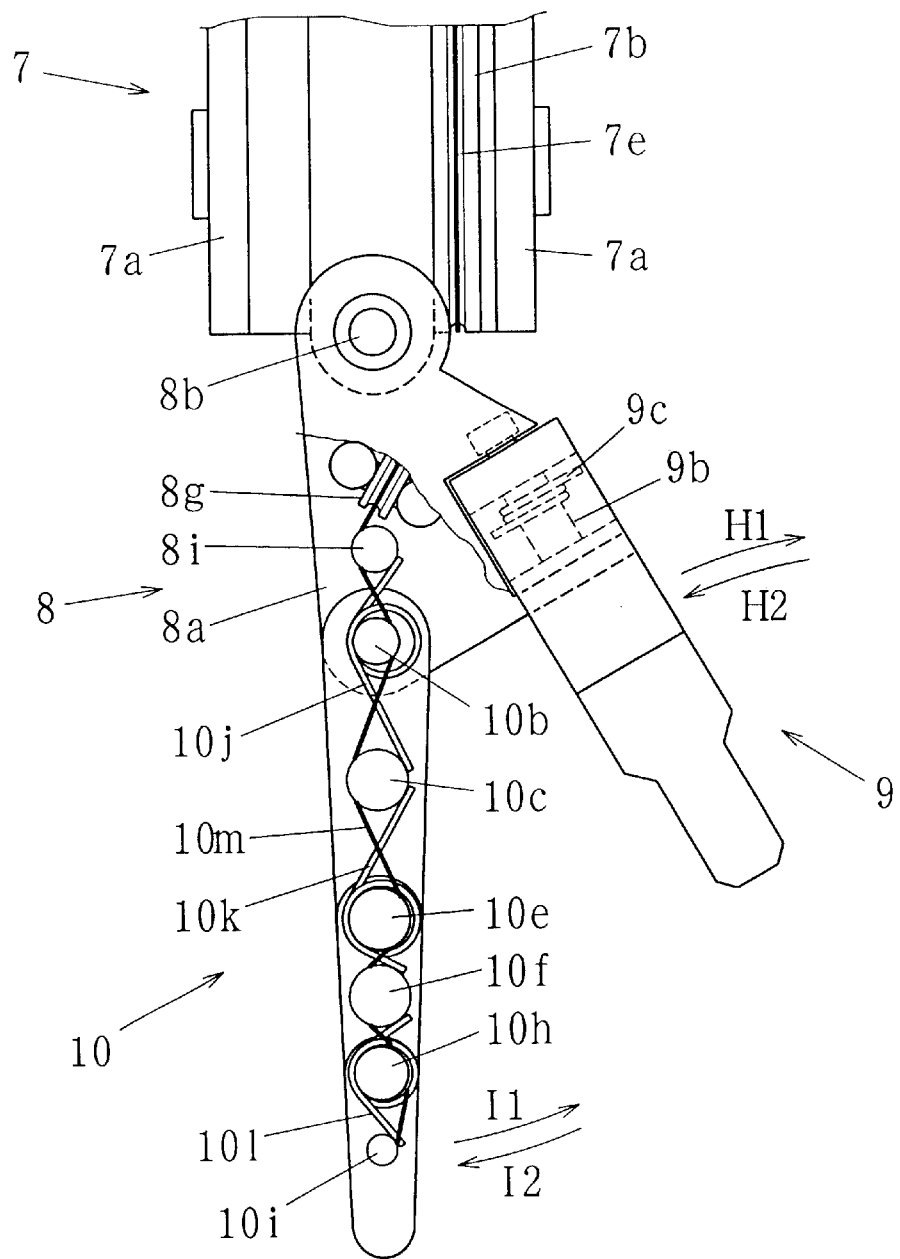
FIG. 3 is an enlarged front elevational view showing the major parts around the hand portion, first finger portion, second finger portion and third finger portion.
Figure 4:
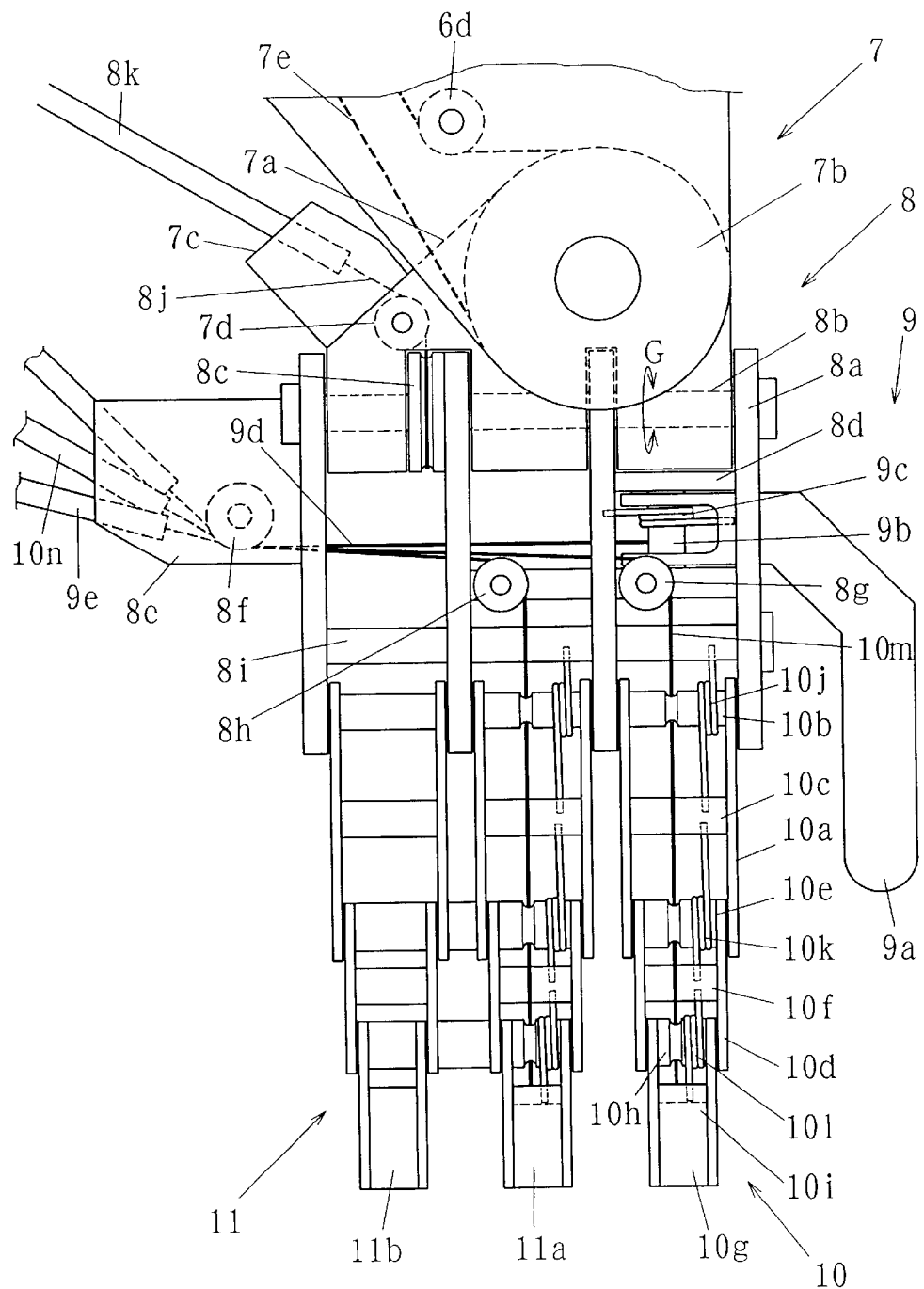
FIG. 4 is a partially exploded and enlarged side elevational view of the major parts around the hand portion, first finger portion, second finger portion and third finger portion.

FIG. 3 is an enlarged front elevational view showing the major parts in the vicinity of the hand portion, the first finger, second finger and third finger. FIG. 4 is a partially exploded and enlarged side elevational view showing the abovementioned components.

In FIG. 3 and FIG. 4, 6d is a guide member, 7 is a wrist portion, 7a is a wrist member, 7b is a wrist pulley, 7c is a flexible tube fixing portion, 7d is a guide member, 7e is a wrist wire, 8 is a hand portion, 9 is the first finger, 10 is the second finger, and 11 is the third finger. These components are similar to those in FIG. 1 and FIG. 2 and are given the same reference numbers. Accordingly, the description is omitted.

8a is a hand member having a rotating axis 8b fixed at the upper part thereof, and is pivotally supported at the lower part of the wrist member 7a by the rotating axis 8b. 8c is a hand pulley fixed at the rotating axis 8b. 8d is a pivotally supporting portion which pivotally supports the end portion of the first finger 9 described later. 8e is a flexible tube fixing portion formed at the side of the hand member 8a. 8f are three guide members which, respectively, guide three wires of the first finger wire, the second finger wire, and the third finger wire described later. 8g is a guide member for guiding the second finger wire described later. 8h is a guide member for guiding the third finger wire described later. 8i is a guide member for guiding the second finger wire and third finger wire which pass through the guide members 8g and 8h. 8j is an endless hand wire which starts from a hand motor (not illustrated) and returns to the same hand motor via the flexible tube fixing portion 7c, guide member 7d, hand pulley 8c, guide member 7d, and flexible tube fixing portion 7c. 8k is a hand flexible tube in which the hand wire 8j is slidably inserted, one end of which is fixed at the flexible tube fixing portion 7c, and the other end of which is fixed in the vicinity of the hand motor. By driving the hand motor, the hand wire 8j is rotated, in line with which the hand pulley 8c turns. Accordingly, the hand portion 8 turns in the direction of the arrow G.

9 is the first finger portion, one end of which is supported at the middle of the hand portion 8 rotatable in the direction of the arrows H1 and H2. 9a is the first finger member, having the first finger pulley 9b fixed at one end portion thereof, in which the corresponding one end portion is pivotally supported at the pivotally supporting portion 8d, coaxially with the first finger pulley 9b. 9c is a twisted coil spring annularly attached to the first finger pulley 9b. 9d is the first finger wire having one end thereof connected to the first finger motor (not illustrated) and the other end fixed at the first finger pulley 9b via the flexible tube fixing portion 8e and guide member 8f. 9e is the first finger flexible tube in which the first finger wire 9d is slidably inserted, one end of which is fixed at the flexible tube fixing portion 8e and the other end of which is connected in the vicinity of the first finger motor. By driving the first finger motor in the direction of winding up the first finger wire 9d, the first finger wire 9d is tracked toward the first finger motor side and the first finger member 9a is moved in the direction of the arrow H1. As the first finger motor is driven in the direction of sending out the first finger wire 9d, the first finger member 9a is moved in the direction of the arrow H2 by the restoration force of the twisted coil spring 9c.

10 is the second finger portion having the upper part thereof supported at the lower part of the hand portion 8 rotatable in the directions of the arrows I1 and I2. 10a is the upper part second finger member, having the upper second finger pulley 10b fixed on the upper part thereof, in which the corresponding upper part is pivotally supported on the lower part of the hand member 8a coaxially with the upper second finger pulley 10b. 10c is a guide member fixed at the middle of the upper part second finger member 10a. 10d is the lower part second finger member, having the lower part second finger pulley 10e fixed on the upper part thereof, in which the corresponding upper part is pivotally supported at the lower part of the upper part second finger member 10a coaxially with the lower part second finger pulley 10e. 10f is a guide member fixed at the middle of the lower part second finger member 10d. 10g is a finger tip second finger member, having the finger tip second finger pulley 10h fixed on the upper part, in which the corresponding upper part is pivotally supported at the lower part of the lower part second finger member 10d coaxially with the finger tip second finger pulley 10h. 10i is a wire fixing portion fixed at the middle of the finger tip second finger member 10g. 10j is a twisted coil spring annularly attached to the upper part second finger pulley 10b, one end portion of which is brought into contact with the guide member 8i, and the other end portion of which is brought into contact with the guide member 10c. 10k is a twisted coil spring annularly attached to the lower part second finger pulley 10e, one end portion of which is in contact with the guide member 10c and the other end portion of which is in contact with the guide member 10f. 10l is a twisted coil spring annularly attached to the finger tip second finger pulley 10h, one end portion of which is in contact with the guide member 10f, and the other end portion of which is in contact with the wire fixing portion 10i. 10m is the second finger wire, one end of which is connected to the second finger motor (not illustrated), and the other end of which is fixed at the wire fixing portion 10i via the flexible tube fixing portion 8e, guide members 8f, 8g, and 8i, upper part second finger pulley 10b, guide member 10c, lower part second finger pulley 10e, guide member 10f, and finger tip second finger pulley 10h. 10n is the second finger flexible tube in which the second finger wire 10m is a slidably inserted, one end of which is fixed at the flexible tube fixing portion 8e, and the other end of which is fixed in the vicinity of the second finger motor. By driving the second finger motor in the direction of winding up the second finger wire 10m, the second finger wire 10m is tracked to cause the second finger portion 10 to move in the direction of I1. By driving the second finger motor in the direction of sending out the second finger wire 10m, the second finger portion 10 is caused to move in the direction of I2 by the restoration forces of the twisted coil springs 10j, 10k and 10l.

11 is the third finger portion having the upper part thereof supported at the lower part of the hand portion 8 rotatable in the direction of I and provided at the second finger portion 10 in parallel therewith. 11a is a drive third finger portion whose construction is the same as that of the second finger 10, and in which the third finger wire is fixed at the finger tip portion. 11b is a driven third finger portion which moves integral with the drive third finger portion 11a. Also, the fourth finger corresponding to the little finger can be disposed as the first finger 9 is disposed.

According to a manipulator of the first preferred embodiment of the invention constructed as above, the following actions can be brought about.

(1). By driving the shoulder motor, upper arm motor, first middle arm motor, second middle arm motor, lower arm motor, wrist motor, and hand motor, the shoulder wire 2f, upper arm wire 3d, first middle arm wire 4e, second middle arm wire 5d, lower arm wire 6e, wrist wire 7e, and hand wire 8j are caused to turn. In line therewith, the shoulder pulley 2a, upper arm pulley 3b, first middle arm pulley 4a, second middle arm pulley 5b, lower arm pulley 6a, wrist pulley 7b, and hand pulley 8c are caused to turn. Accordingly, the shoulder portion 2, upper arm portion 3, first middle arm portion 4, second middle arm portion 5, lower arm portion 6, wrist arm portion 7 and hand portion 8 are caused to turn.

(2). By driving the first finger motor, second finger motor, and third finger motor in the direction of winding up the respective wires, the first finger portion 9, second finger portion 10 and third finger portion 11 are caused to move. By driving the first finger motor, second finger motor, and third finger motor in the direction of sending out the respective wires, they are returned to the respective original positions (positions where the respective hands are open) just before having moved, by the restoration force of the respective twisted coil springs.

(3). Since the respective wires are inserted into the flexible tubes, it is possible to connect wires from the motors directly to the pulleys even though there exist any obstacle such as other members between the pulleys and motors.

(4). Since the respective motors are not disposed at the manipulator 1, but can be disposed at the supporting base of the body portion of a robot, no space is required to dispose motors at the respective joints, whereby it is possible to shorten the distance between the joints, and the manipulator itself can be easily lightened and down-sized. By down-sizing the manipulator 1, the entire apparatus (for example a robot) having the manipulator 1 can be made smaller, and transferability can be much improved. Accordingly, work can be carried out in narrow spaces, whereby working efficiency is excellent. Also, since the manipulator 1 can be lightened, the torque of the motor for the portion which supports the weight of the entire manipulator 1 (in the first embodiment, the shoulder motor) and the motor for moving the entire apparatus can be reduced. Therefore, power consumption can be saved.

(5). Since one pulley is provided for each of the motors, independent control of the respective motors is enabled, whereby the respective joints are caused to operate independently from the other joints, and complicated motions are accordingly enabled. Therefore, working efficiency can be also improved.

Next, a description is given of disposed states of the respective motors.

Figure 5A:
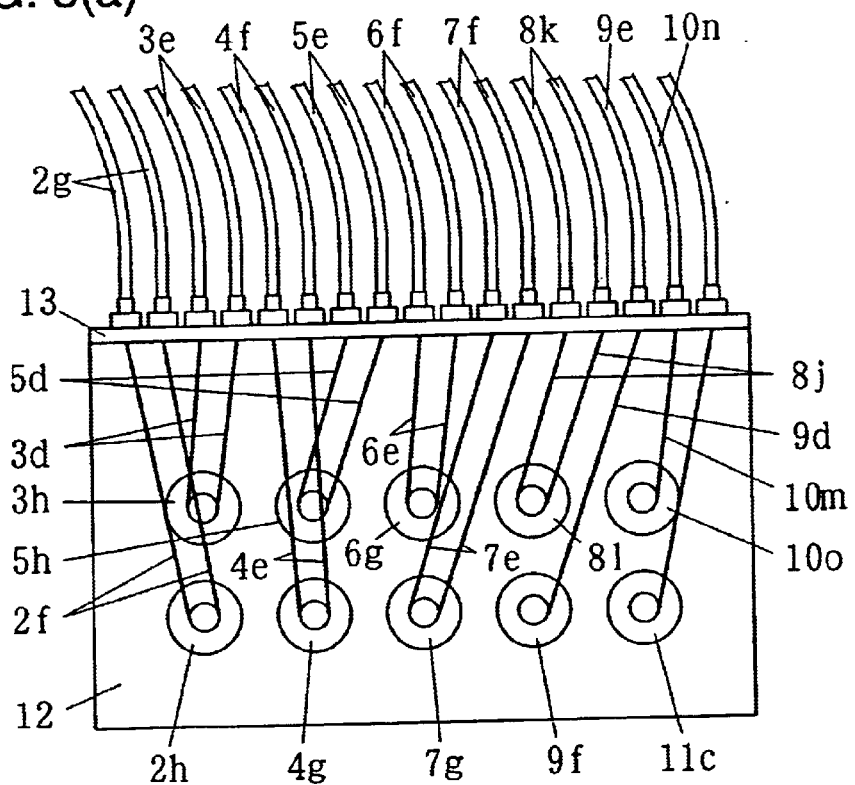
FIGS. 5(a) and 5(b) are views showing states where the respective motors in the first embodiment of the invention are disposed on a supporting base, and the respective placement of the manipulator and motors.
Figure 5B:
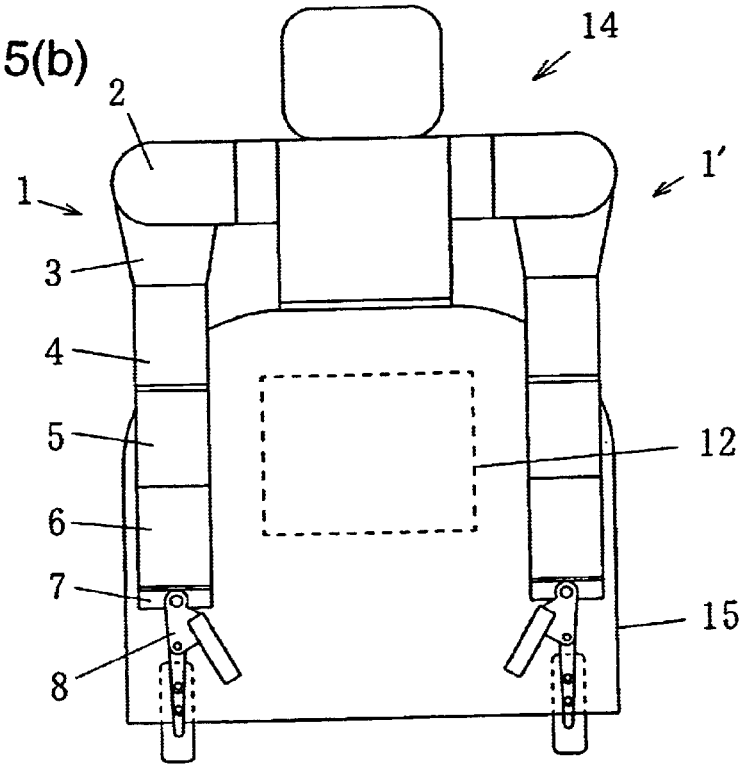

5(a) is a view showing a state where the respective motors in the first embodiment of the invention are disposed on the supporting base and FIG. 5(b) is a view showing the respective placement of the manipulator and the motors.

In FIG. 5(a), 2f is a wire, 2g is a flexible tube, 3d is a wire, 3e is a flexible tube, 4e is a wire, 4f is a flexible tube, 5d is a wire, 5e is a flexible tube, 6e is a wire, 6f is a flexible tube, 7e is a wire, 7f is a flexible tube, 8j is a wire, 8k is a flexible tube, 9d is a wire, 9e is a flexible tube, 10m is a wire, and 10n is a flexible tube. These components are identical to those in FIG. 1 through FIG. 4, wherein the same reference numbers are given thereto, and overlapping description thereof is omitted.

2h is the shoulder motor, 3h is the upper arm motor, 4g is the first middle arm motor, 5h is the second middle arm motor, 6g is the lower arm motor, 7g is the wrist motor, 81 is the hand motor, 9f is the first finger motor, 10o is the second finger motor, 11c is the third finger motor, 12 is a motor box in which the respective motors disposed on the supporting base are accommodated. 13 is a flexible tube fixing portion, disposed on the motor box 12, in which the end portions of the respective flexible tubes are fixed.

Embodiment 2

In FIG. 5(b) 1 and 1' are manipulators, 2 is a shoulder, 3 is an upper arm portion, 4 is the first middle arm portion, 5 is the second middle arm portion, 6 is a lower arm portion, 7 is a wrist portion, 8 is a hand portion. These components are similar to those in FIG. 1 through FIG. 4 and are given the same reference numbers. Accordingly, the description is omitted.

14 is a robot which provides a manipulator 1 as a right arm and a manipulator 1' as a left arm, 15 is a supporting base which is a body portion of the robot 14, the supporting base 15 disposes the motor box 12 in which the motors to drive manipulators 1 and 1' are accommodated.

Next, a description is given to a tension detection mechanism and a finger operation apparatus, which are used for a manipulator of the first embodiment, with reference to the accompanying drawings.

Figure 6:
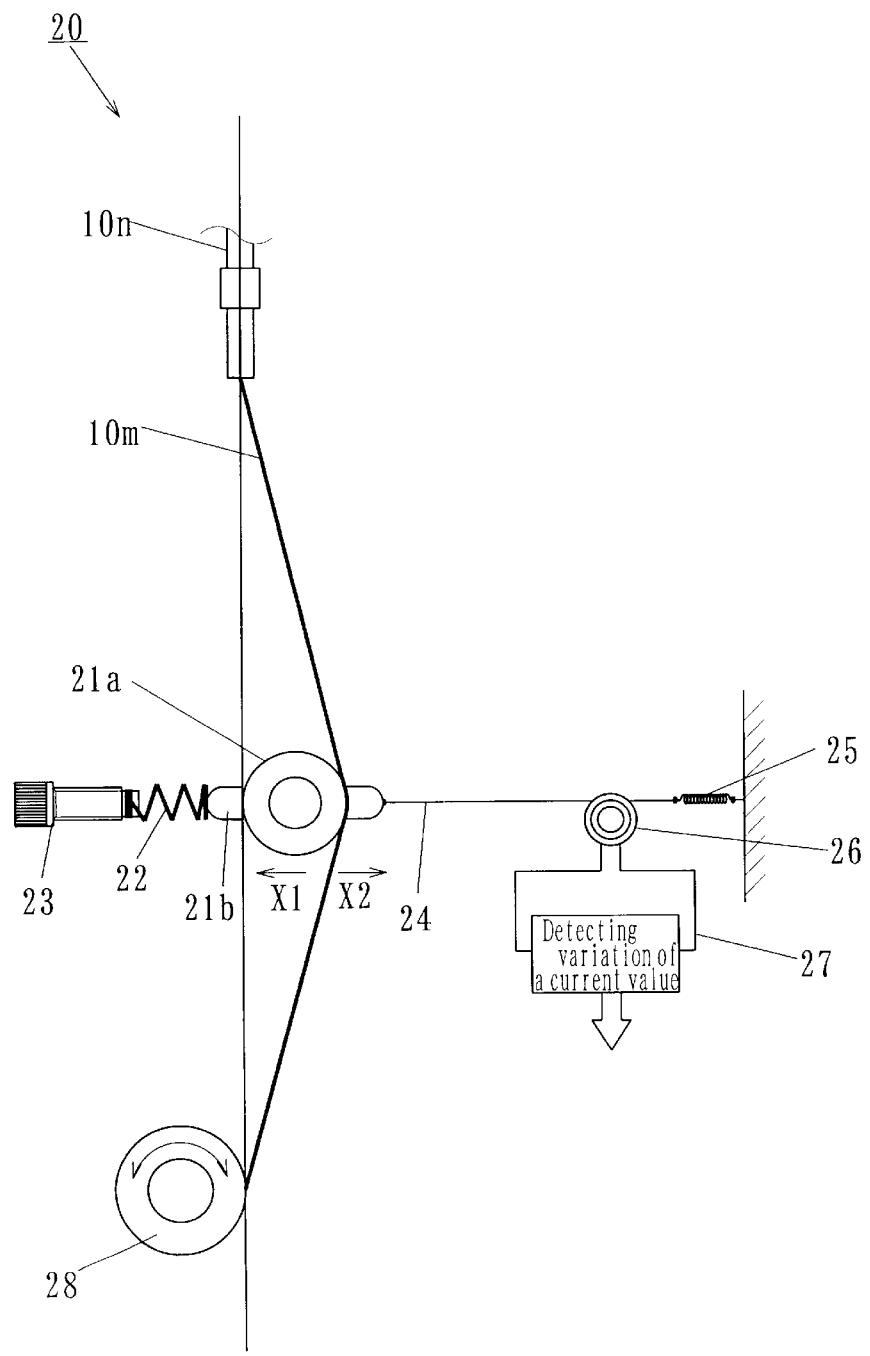
FIG. 6 is a view showing a tension detecting mechanism in the second embodiment of the invention.

FIG. 6 is a view showing a tension detecting mechanism according to the second embodiment of the invention. However, in the drawing, only one system (herein, the second finger portion system) of the three systems consisting of the first finger portion, second finger portion, and third finger portion is shown. The systems of the other two are identical to that of the one system already shown.

In FIG. 6, 10m is the second finger wire, and 10n is the second flexible tube. The structure of these components is identical to that in the first embodiment, and the same reference numbers are given thereto, wherein overlapping description is omitted.

20 is a tension detecting mechanism in the second embodiment of the invention and is disposed in the vicinity of the second finger motor. 21a is a tension pulley, having one side thereof in contact with the second finger wire 10m, which deflects the second finger wire 10m. 21b is a pulley shuttle, which is slidably disposed in the direction orthogonal to the second finger wire 10m, having a tension pulley 21a provided at the center thereof. 22 is a tension spring, having one end thereof in contact with the pulley shuttle 21b, which presses the tension pulley 21a to the second finger wire 10m side. 23 is an adjustment screw, whose tip end presses the tension spring 22 to the pulley shuttle 21b side, and in which the degree of pressure is adjustable. 24 is a tension wire, one end of which is fixed at the pulley shuttle 21b and the other end of which is fixed at an appointed portion of the supporting base. 25 is a return spring disposed at an appointed portion of the tension wire 24. 26 is a potentiometer, one end of which is brought into contact with the pulley shuttle 21b side from the return spring 25 of the tension wire 24, and turns in line with movement of the tension wire 24. 27 is a circuit to which a fixed level of voltage is applied, wherein the value of resistance varies in line with turning of the potentiometer 26 and the current value of the circuit 27 is varied. 28 is a winding pulley fixed at the rotating axis of the second finger motor.

Figure 7:
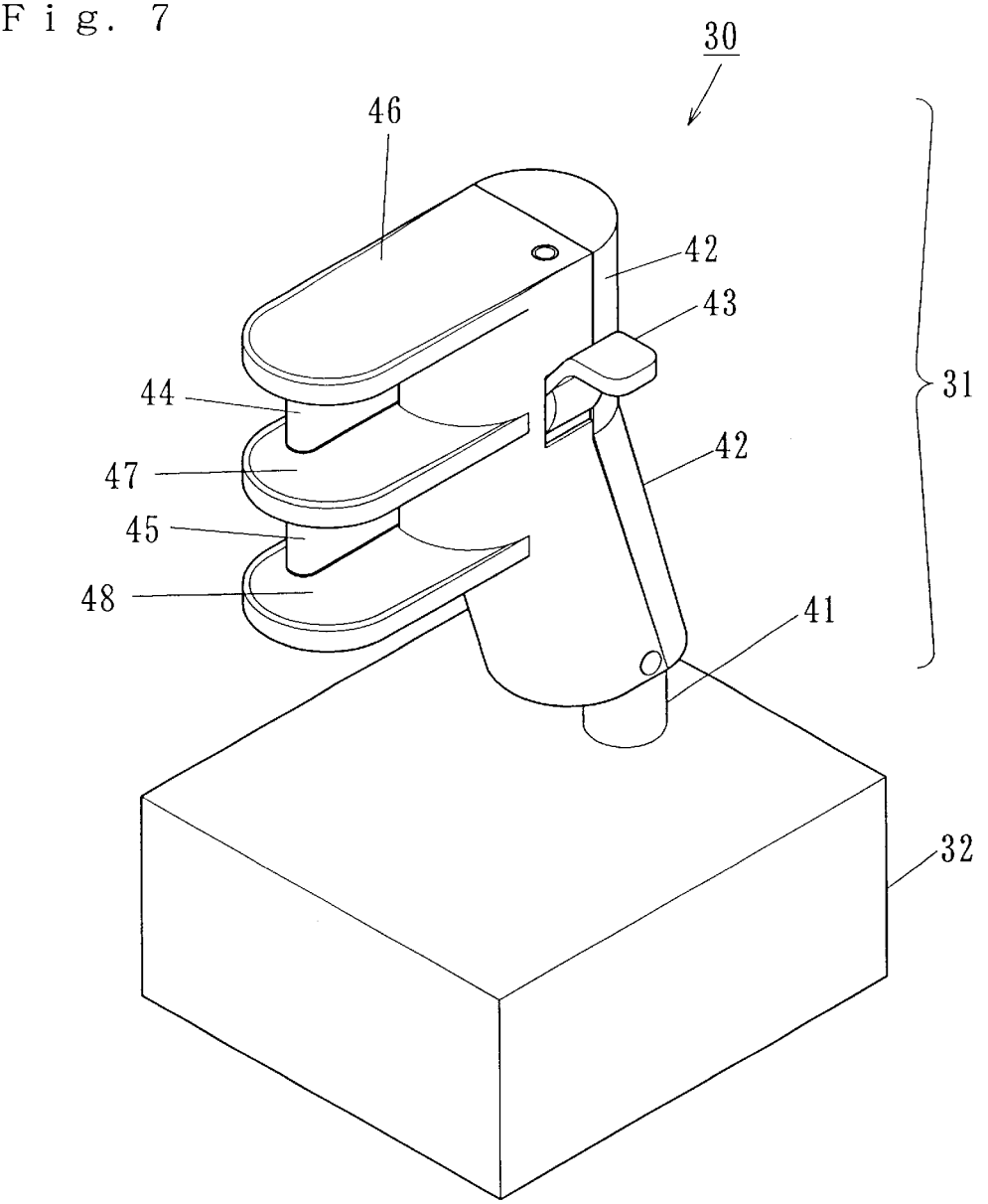
FIG. 7 is a perspective view showing a finger operating apparatus in the second embodiment of the invention.

FIG. 7 is a perspective view showing a finger operation apparatus in the second embodiment of the invention.

In FIG. 7, 30 is a finger operation apparatus in the second preferred embodiment of the invention. 31 is a finger operating joystick. 32 is a signal reaction generator, 41 is a shaft for the joystick rotatably attached to the signal reaction generator 32. 42 is a roughly cylindrical body attached on the upper part of the joystick shaft 41. 43 is a tongue-like first finger flexing instruction portion rotatably attached to the side of the cylindrical portion 42. 44 is the second finger flexing instruction portion of a rectangular projection type, which is retractably attached on the front upper surface of the cylindrical body 42. 45 is the third finger flexing instruction portion of a rectangular projection type, which is retractably attached on the front lower surface of the cylindrical body 42. 46, 47 and 48 are guide members which guide the advance and retreat of the second finger flexing instruction portion 44 and the third finger flexing instruction portion 45.

Figure 8:
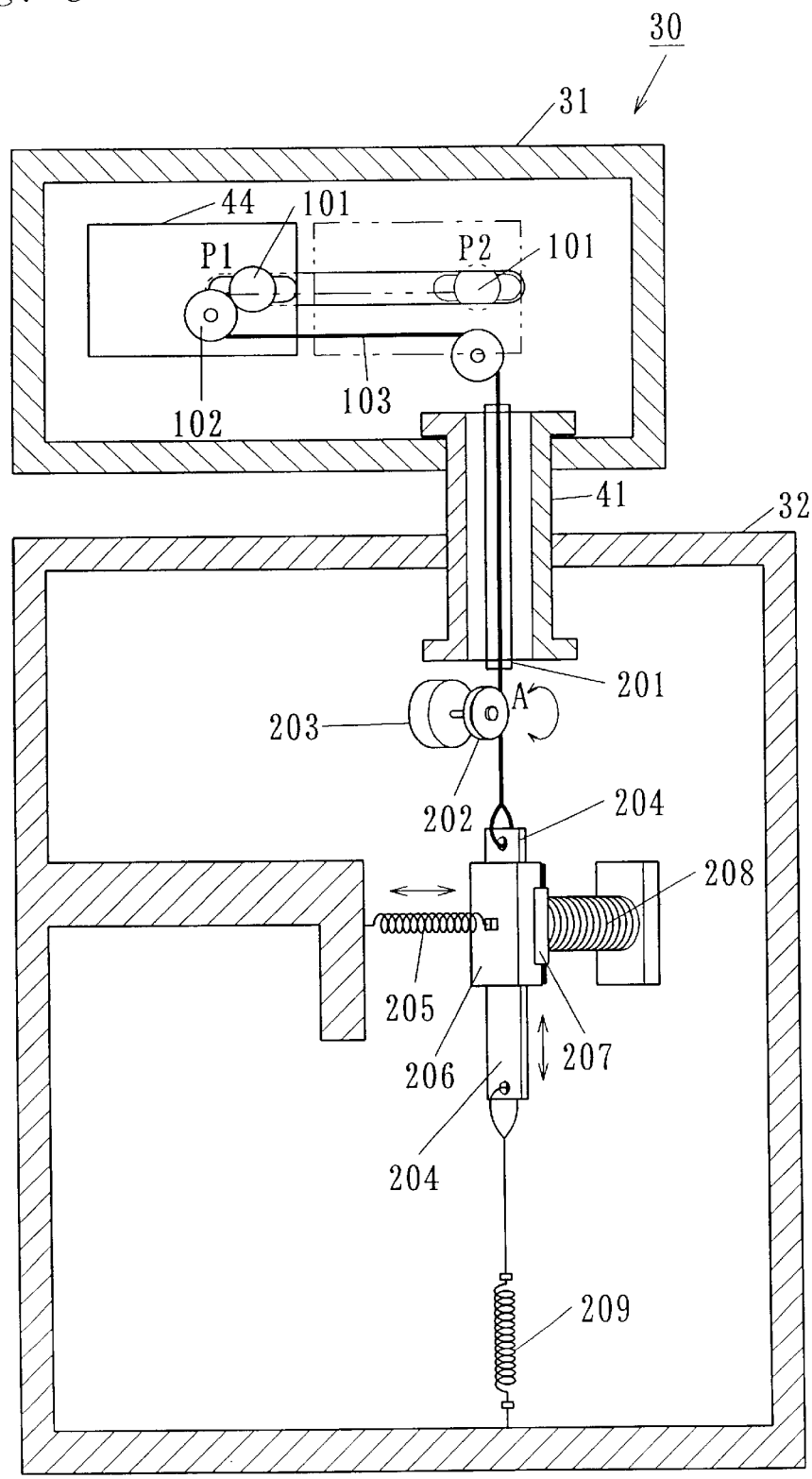
FIG. 8 is a view showing a mechanism of a finger operating apparatus in the second embodiment of the invention.

FIG. 8 is a view showing a mechanism of a finger operation apparatus according to the second embodiment of the invention. However, in the drawing, only one system (herein, the second finger portion system) of the three systems consisting essentially of the first finger portion, second finger portion, and third finger portion is shown. The systems of the other two are identical to that of the one system.

In FIG. 8, 30 is a finger operating apparatus. 31 is a finger operating joystick. 32 is a signal reaction generator. 41 is a shaft. 44 is the second finger lever acting as the second finger flexing instruction portion. Since these components are identical to those in FIG. 7, they are given the same reference numbers, and overlapping description thereof is omitted herein.

101 is a moving pulley which can move in the left and right direction in a range from P1 to P2 in compliance with the movements of the second finger lever 44. 102 is a fixed pulley, 103 is a wire, one end of which is anchored at the moving pulley 101, and the other end of which is anchored at a friction plate 204. 201 is a flexible tube into which the wire 103 is inserted. 202 is a pulley on which the wire 103 is wound one or more times. 203 is a potentiometer which turns along with the pulley 202. 205 is a spring, one end of which is fixed and the other end of which is anchored to a pressing plate 206. The pressing plate 206 is composed of a magnetic body which progressively advances in compliance with the amount of current onto an electromagnet 208. 207 is a nipping plate disposed opposite to the pressing plate 206. 209 is a return spring, one end of which is anchored at the fixing portion of the signal reaction generator 32. Herein, the wire 103 and return spring 209 are provided for each of the three systems. The wire and return spring for the first finger portion, the second finger portion or the third finger portion are, respectively, called the first, second or third wire or return spring. Therefore, the wire 103 and return spring 209 illustrated in FIG. 7 are the second wire or the second return spring. By pressing the second finger portion lever 44 by the second finger portion, the lever 44 is caused to move to right side toward the position P2 in FIG. 7. In line therewith, the wire 103 moves upwards in the shaft 41, the pulley 202 turns left in the direction of the arrow A (in the case where the wire 103 coming from upward is wound on the pulley 202 in the right direction), and accordingly the potentiometer 203 turns left. Thereby, the resistance value of the potentiometer 203 becomes a value responsive to the moving distance of the wire 103, that is, the amount of movement of the moving pulley 101 (i.e., the amount of the pressure of the lever 44), wherein if an appointed level of voltage is applied to the potentiometer 203, a flexing instruction signal of the voltage value responsive to the distance which the moving pulley 101 moved can be generated.

A description is given below of the action the tension detecting mechanism and finger operating joystick in the second preferred embodiment of the invention constructed as described above. Also, in the second embodiment, the description is based on the case where, a reaction signal (reaction detecting motion) is first obtained by detecting the reaction, which is produced at the second finger portion by a gripping motion, as the tension of the second finger wire, the reaction produced at the second finger portion by the finger operating joystick on the basis of the reaction signal is reproduced (reaction applying motion).

First, a description is given of the reaction detecting motion. The reaction detection motion is to detect a reaction, applied to the finger, which is produced by a gripping motion at the manipulator 1 operating based on the flexing instruction signal from the finger operating apparatus 30. If the second finger motor is driven in the direction of winding up the second finger wire 10m, the winding pulley 28 starts turning to cause the second finger wire 10m to be tracked, whereby the second finger portion 10 is moved in the direction of the arrow I1. As the second finger portion 10 gradually moves in the direction of the arrow I1 and is brought into contact with an object (not illustrated) grasped by the manipulator 1 of a tool, etc., the movement of the second finger portion 10 is hindered by the corresponding object. As the second finger motor is further driven, the flexing amount of the second finger wire 10m is decreased, wherein the second finger wire 10m presses the tension pulley 21a in the direction of X1. In line therewith, the tension wire 24 is tracked by the pulley shuttle 21b in the direction X1, whereby the potentiometer 26 is caused to turn. As the potentiometer 26 turns, the resistance value of the circuit 27 varies, whereby the value of a current flowing in the circuit 27 is changed. By detecting the corresponding current, the tension of the second finger wire 10m can be detected as a reaction to the second finger portion 10.

Next, a description is given of a reaction applying motion. The reaction applying motion is to provide a reaction, which is similar to the reaction detected by the reaction detecting motion, to the finger of the finger operating apparatus 30. As the current, which is based on the reaction from the manipulator 1 detected by a reaction detecting motion flows to the electromagnet 208, the pressing plate 206 advances, and presses the friction plate 204 along with the nipping plate 207. The pressure force is determined by the value of the current flowing in the electromagnet 208, that is, the reaction value expressed by the reaction signal. Where the pressing force is increased, it becomes more difficult for the wire 103 to move and for the lever 44 to move. Thus, a reaction responsive to the reaction value at the robot apparatus side can be produced at the finger operating apparatus 30. That is, by controlling the current flowing in the electromagnet 208 by a reaction signal, it is possible to reproduce the reaction in the robot apparatus at the finger operating apparatus 30 side. In addition, the potentiometer 203 is a potentiometer for the second finger portion (the second potentiometer, the second detector). As described above, there are potentiometers for the first finger and the third finger (the first and third potentiometer, the first and third detector).

With the tension detecting mechanism of the second preferred embodiment of the invention constructed as described above, the following actions can be brought about.

(1). In the tension detecting mechanism 20, the tension of the second finger wire 10m can be detected as a reaction to the second finger portion 10, wherein it is possible to adjust the difficulty in movement of the second finger portion lever 44 on the basis of the detected reaction. Therefore, a reaction responsive to the reaction of the second finger portion 10 of the manipulator 1 can be reproduced at the finger operating apparatus 30 and can be transmitted to an operator, whereby it is possible to operate the manipulator 1 in compliance with the actual states.

What is claimed is:

1. A manipulator provided in combination with a supporting base, comprising:
   a plurality of joints disposed on said manipulator;
   a pulley disposed at each of said plurality of joints, respectively;
   a plurality of motors disposed on said supporting base;
   an endless wire for each of said pulleys, wherein each of said endless wires has an appointed portion fixed to said pulley, wherein each of said endless wires is rotated by one of said plurality of motors, respectively; and
   a flexible tube for each of said endless wires, wherein each of said endless wires is inserted into said flexible tube, respectively, each of said flexible tubes having one end fixed in the vicinity of a side of said respective pulley and another end fixed in the vicinity of said respective motor; and
   wherein each of said plurality of pulleys corresponds to a different one of said plurality of motors so that each of said plurality of pulleys disposed on said manipulator is driven by a separate one of said plurality of motors disposed on said supporting base, in one-to-one correspondence.

2. A manipulator provided in combination with a supporting base, comprising:
   a plurality of joints disposed on said manipulator;
   a pulley disposed at each of said plurality of joints;
   a plurality of motors disposed on said supporting base;
   a linear wire for each of said pulleys, wherein each of said linear wires is connected to one of said plurality of motors, respectively, said linear wire having one end thereof fixed at said pulleys and the other end thereof connected to said respective motor;
   a flexible tube for each of said linear wires to be inserted therein, said flexible tube having one end fixed in the vicinity of a side of said respective pulley and another end fixed in the vicinity of said respective motor; and
   a twisted coil spring disposed in engagement with each of said pulleys, wherein said twisted coil spring contracts as said motor winds up said respective linear wire; and
   wherein each of said plurality of pulleys corresponds to a different one of said plurality of motors so that each of said plurality of pulleys disposed on said manipulator is driven by a separate one of said plurality of motors disposed on said supporting base, in one-to-one correspondence.

3. A manipulator as set forth in claim 2 further comprising a tension detecting mechanism disposed at an appointed portion of each of said linear wires and enabling detection of the tension of said wire.

4. A manipulator as set forth in claim 3, wherein said tension detecting mechanism comprises:
- a tension pulley having one side thereof brought into contact with said appointed portion of said wire, wherein said tension pulley is disposed slidably in the vertical direction along said wire;
- a traction means for tracking said tension pulley to a wire side; and
- a potentiometer, whose resistance value varies in line with an amount of movement of said traction means, disposed at an appointed portion of said traction means.

5. A manipulator disposed at a body portion of a robot or a supporting base at a work site and having one or more joints and a mechanism for moving and rotating said joints, said moving and rotating mechanism comprising:
- a pulley disposed at said joints;
- a linear wire for each of said pulleys, wherein each of said linear wires is connected to a motor, respectively, said linear wire having one end thereof fixed at said pulleys and the other end thereof connected to said motor which is fixed at an appointed portion of said supporting base;
- a flexible tube for each of said linear wires to be inserted therein, said flexible tube having one end fixed in the vicinity of a side of said pulley and another end fixed in the vicinity of said motor;
- a twisted coil spring disposed in engagement with each of said pulleys, wherein said twisted coil spring contracts as said motor winds up said respective linear wire, wherein each of said motors is disposed for each of said pulleys, respectively, so that each pulley corresponds to a different one of said motors; and a tension detecting mechanism disposed at an appointed portion of each of said linear wires and enabling detection of the tension of said wire, wherein said tension detecting mechanism comprises:
- a tension pulley having one side thereof brought into contact with said appointed portion of said wire, wherein said tension pulley is disposed slidably in the vertical direction along said wire;
- a traction means for tracking said tension pulley to a wire side; and
- a potentiometer, whose resistance value varies in line with an amount of movement of said traction means, disposed at an appointed portion of said traction means, wherein said traction means includes a return spring disposed at a first end of a tension wire, wherein said tension wire has a second end fixed to a pulley shuttle coupled with said tension pulley, and said potentiometer is disposed on a portion of said tension wire that is between said return spring and said pulley shuttle.

* * * * *